United States Patent
Hahn et al.

(10) Patent No.: US 7,159,039 B1
(45) Date of Patent: Jan. 2, 2007

(54) SYSTEMS AND METHODS FOR PROVIDING IN-BAND AND OUT-BAND MESSAGE PROCESSING

(75) Inventors: Mark J. Hahn, Stow, MA (US); Kevin Brophy, Brockton, MA (US); Anita L. Chow, Nashua, NH (US); Luis D. Letjer, Revere, MA (US); David C. Robbins, Grafton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 413 days.

(21) Appl. No.: 09/652,908

(22) Filed: Aug. 31, 2000

Related U.S. Application Data

(60) Provisional application No. 60/185,382, filed on Feb. 28, 2000.

(51) Int. Cl.
*G06F 15/16* (2006.01)
(52) U.S. Cl. .................... 709/246; 709/202
(58) Field of Classification Search ........... 709/206, 709/203, 231, 230, 232, 236, 238, 246, 202, 709/207, 204; 707/3, 9
See application file for complete search history.

(56) References Cited

U.S. PATENT DOCUMENTS

| | | | | |
|---|---|---|---|---|
| 5,748,884 A | * | 5/1998 | Royce et al. | 714/57 |
| 5,818,447 A | * | 10/1998 | Wolf et al. | 709/206 |
| 6,023,700 A | * | 2/2000 | Owens et al. | 707/10 |
| 6,052,442 A | * | 4/2000 | Cooper et al. | 379/88.19 |
| 6,052,735 A | * | 4/2000 | Ulrich et al. | 709/236 |
| 6,067,568 A | * | 5/2000 | Li et al. | 709/223 |
| 6,134,582 A | * | 10/2000 | Kennedy | 709/206 |
| 6,157,630 A | * | 12/2000 | Adler et al. | 370/338 |
| 6,182,118 B1 | * | 1/2001 | Finney et al. | 709/206 |
| 6,185,551 B1 | * | 2/2001 | Birrell et al. | 707/3 |
| 6,253,202 B1 | * | 6/2001 | Gilmour | 707/9 |
| 6,484,196 B1 | * | 11/2002 | Maurille | 709/206 |
| 6,782,412 B1 | * | 8/2004 | Brophy et al. | 709/204 |
| 2001/0052019 A1 | * | 12/2001 | Walters et al. | 709/231 |
| 2002/0111991 A1 | * | 8/2002 | Wood et al. | 709/203 |

OTHER PUBLICATIONS

U.S. Appl. No. 09/382,006, filed Aug. 24, 1999.

* cited by examiner

*Primary Examiner*—Paul H. Kang

(57) ABSTRACT

A personal messaging agent (220) performs enhanced messaging services. The personal messaging agent (220) includes a user profile (310), a message filter (320), and at least one external helper (330). The user profile (310) stores user preferences for processing messages. The message filter (320) receives messages, performs in-band processing on the messages based on the user preferences, and generates at least one event for triggering out-of-band processing of the messages. The external helpers (330) perform the out-of-band processing of the messages in response to the event(s).

29 Claims, 8 Drawing Sheets

SYSTEMS AND METHODS FOR PROVIDING IN-BAND AND OUT-BAND MESSAGE PROCESSING

RELATED APPLICATION

This application claims priority under 35 U.S.C. § 119 based on U.S. Provisional Application No. 60/185,382, filed Feb. 28, 2000, the disclosure of which is incorporated herein by reference.

BACKGROUND OF THE INVENTION

A. Field of the Invention

The present invention relates generally to messaging systems and, more particularly, to systems and methods that provide enhanced services for e-mail messages.

B. Description of Related Art

Electronic mail ("e-mail") is quickly becoming a standard mode of communication. E-mail' popularity can be attributed to the ease with which e-mail messages may be transmitted and the speed with which a transmitted message arrives at its intended destination. For example, to transmit a single e-mail message, the sender typically inputs a message and addresses the message with the recipient's e-mail address. When the message is complete, the sender commands the e-mail software to transmit the message, and the message is then delivered over a network, such as the Internet. The delivered message is quickly received by the recipient via a computer or the like.

FIG. 1 is a diagram of a conventional e-mail system 100. The e-mail system 100 includes a message arrival component 110, user mailboxes 120, message retrieval component 130, and e-mail clients 140. The message arrival component 110 connects to a network, such as the Internet, to receive e-mail messages from one or more e-mail senders, using, for example, computer devices. The message arrival component 110 includes a server 112 and a local delivery agent 114. The server 112 uses a standard transfer protocol, such as the Simple Mail Transfer Protocol (SMTP), to process the e-mail messages and place them in the appropriate user mailboxes 120, typically using the services of a local delivery agent 114. The local delivery agent 114 includes the appropriate software and/or hardware to perform the message delivery.

The user mailboxes 120 include storage locations of one or more memory devices assigned to particular e-mail recipients. The user mailboxes 120 typically store e-mail messages for retrieval by the recipients. The message retrieval component 130 includes a server 132 that uses a conventional message access protocol, such as Post Office Protocol 3 (POP3) or Internet Message Access Protocol 4 (IMAP4), to retrieve the e-mail messages from the user mailboxes 120. The e-mail clients 140 receive instructions from the e-mail recipients and, via the server 132, provide content and state information regarding the messages in the user mailboxes 120 to the e-mail recipients.

Processing by the e-mail system 100 typically commences with an e-mail sender using a computer device to construct and transmit an e-mail message. The e-mail message from the sender is encoded as an RFC822/MIME stream and routed through the network, based on its destination address, to a specific domain using a standard message transfer protocol, such as SMTP. Within that domain, the message stream is routed to the specific SMTP server, such as server 112, responsible for placing the message in the destination mailbox 120. The server 112 sends the message to the local delivery agent 114 for storage in the destination mailbox 120. The local delivery agent 114 delivers the message to the destination mailbox 120 and notifies the server 112 of the delivery status.

When an e-mail recipient desires to retrieve messages from the destination mailbox 120, the recipient uses a computer device to invoke an e-mail client 140 that instructs the server 132 to access the destination mailbox 120. The server 132 uses a standard message access protocol, such as POP3 or IMAP4, to open the destination mailbox 120 and return the content/state information about the message to the e-mail recipient.

Conventional e-mail service providers offer enhanced messaging services that are of value to the user to differentiate themselves from their competitors. Some examples of enhanced messaging features include extracting/blocking unwanted messages or removing unwanted parts of messages; inserting a targeted advertisement (to support low-cost/no-cost mail service); replacing a media file attachment with streaming controls (to reduce download time); notifying the user of the new message (e.g., sending a pager notification, displaying a dialog box, etc.); and redirecting the message to other preferred mail account(s).

Some conventional e-mail providers offer these services by providing an enhanced e-mail client. The enhanced e-mail client, however, is rigid in the sense that it restricts the available services to only those services that the e-mail client was originally designed to provide. Other conventional e-mail providers embed additional functionality into the e-mail message itself, independent of the e-mail client. This approach, however, increases network requirements and costs, both to the provider and the user.

As a result, a need exists for a flexible mechanism to offer enhanced e-mail services without substantially increasing requirements and costs to the provider or the user.

SUMMARY OF THE INVENTION

Systems and methods consistent with the present invention address this need by providing one or more personal messaging agents that intelligently process e-mail messages on behalf of a specific user, independent of the e-mail clients used to retrieve the messages.

In accordance with the purpose of the invention as embodied and broadly described herein, a personal messaging agent performs enhanced messaging services. The personal messaging agent includes a user profile, a message filter, and at least one external helper. The user profile stores user preferences for processing messages. The message filter receives messages, performs in-band processing on the messages based on the user preferences, and generates at least one event for triggering out-of-band processing of the messages. The external helpers perform the out-of-band processing of the messages in response to the event(s).

In another implementation consistent with the present invention, a message arrival system includes a server, multiple personal messaging agents, and a local delivery agent. The server receives message streams from message senders. Each of the message streams may be destined for one or more message recipients. The personal messaging agents receive the message streams from the server, process the message streams based on preferences of the one or more message recipients to create modified message streams, and output the modified message streams. The local delivery agent receives the modified message streams and delivers the modified message streams to mailboxes associated with the message recipients.

In yet another implementation consistent with the present invention, an e-mail system includes a message arrival component and a message retrieval component. The message arrival component includes a server, a personal messaging agent, and a local delivery agent. The server receives an e-mail message from an e-mail sender that is destined for one or more e-mail recipients. The personal messaging agent receives the e-mail message from the server, processes the e-mail message based on preferences of the e-mail recipients to create a processed e-mail message, and outputs the processed e-mail message. The local delivery agent receives the processed e-mail message and places the processed e-mail message in one or more mailboxes associated with the e-mail recipients. The message retrieval system retrieves the processed e-mail message from the mailboxes and delivers the processed e-mail message to the e-mail recipients.

In a further implementation consistent with the present invention, a method for performing personal e-mail services includes storing e-mail processing preferences for one or more e-mail recipients; receiving an e-mail message from an e-mail sender that is destined for one or more of the e-mail recipients; processing the e-mail message based on the e-mail processing preferences; and providing the processed e-mail message for delivery to the e-mail recipients.

In another implementation consistent with the present invention, personal messaging agents provide enhanced messaging services. Each of the personal messaging agents includes a user profile and a message filter. The user profile stores user preferences of a message recipient for processing a message. The message filter receives a message destined for the message recipient, processes the message based on the user preferences to produce a processed message, and delivers the processed message to the message recipient.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a personal messaging agent that permits an e-mail message to be processed based on user-defined preferences. The personal messaging agent may be likened to a personal assistant that is tasked with opening a mail envelope for an individual, tailoring the contents according to the individual's personal preferences, resealing the envelope, placing it in the individual's preferred mailbox, and then notifying the individual of the new message.

Exemplary System

Figure 1:
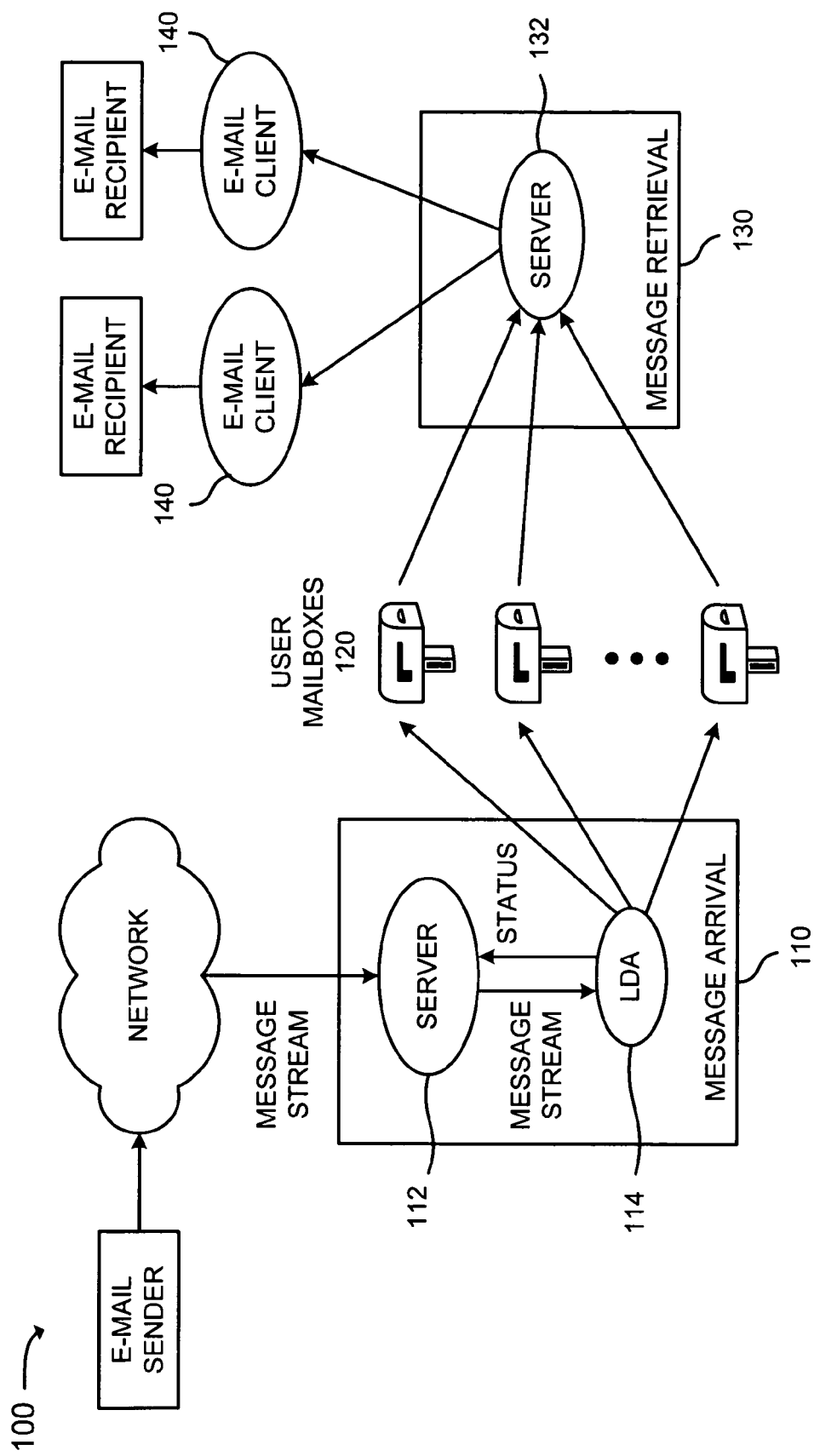
FIG. 1 is a diagram of a conventional e-mail system.
Figure 2:
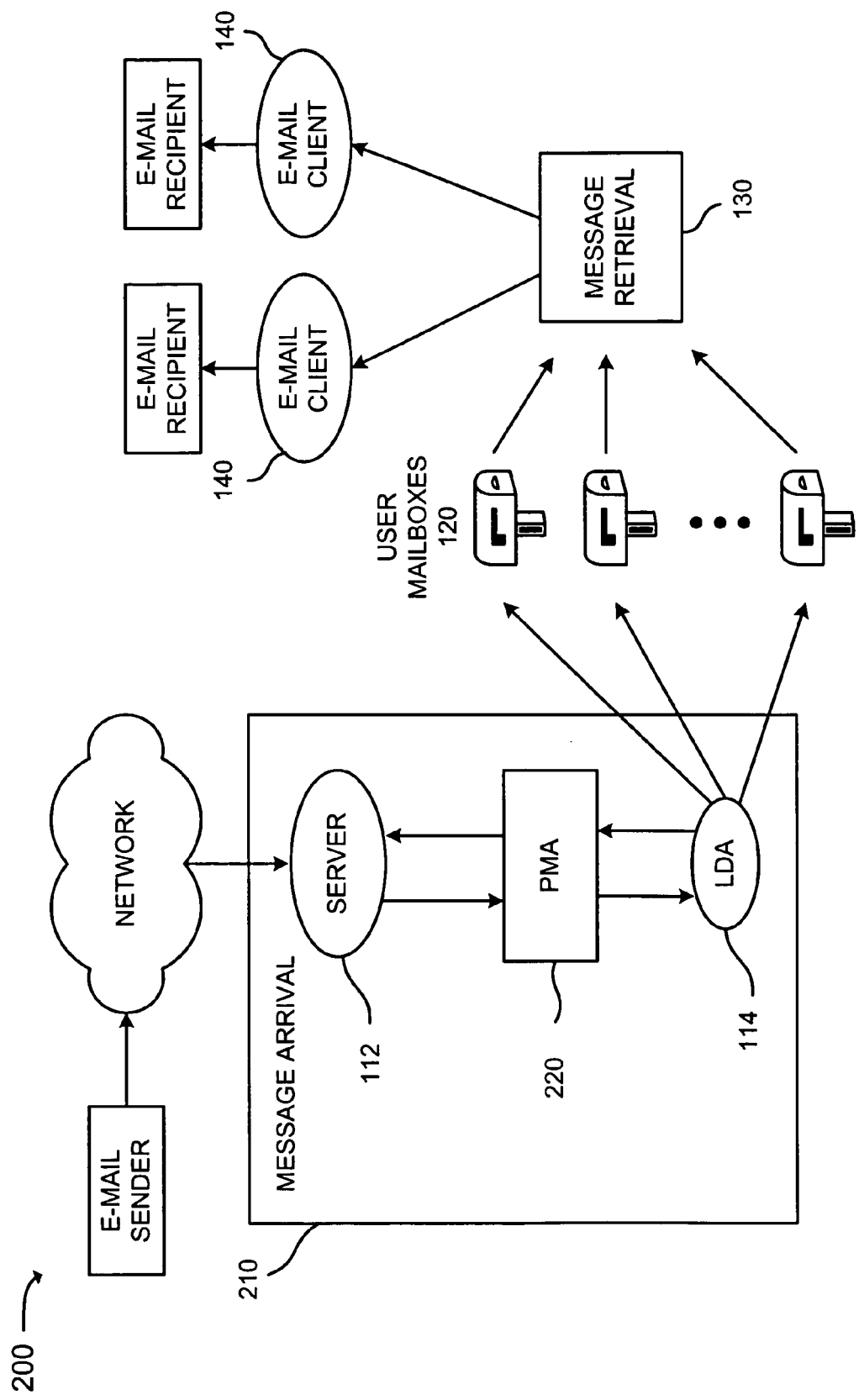
FIG. 2 is an exemplary diagram of an e-mail system in which systems and methods consistent with the present invention may be implemented.

FIG. 2 is a diagram of an exemplary system 200 in which systems and methods consistent with the present invention may be implemented. The system 200 may include one or more e-mail senders, a network, a message arrival component 210, user mailboxes 120, a message retrieval component 130, e-mail clients 140, and one or more e-mail recipients. The message arrival component 210 may include a server 112 and a local delivery agent 114. As can be seen, the system 200 may include some of the elements found in the conventional system 100, such as the e-mail sender(s), the network, the server 112, the local delivery agent 114, the user mailboxes 120, the message retrieval component 130, the e-mail clients 140, and the e-mail recipient(s). Accordingly, these elements will not be described further.

The message arrival component 210 may also include one or more personal messaging agents (PMAs) 220 connected between the server 112 and the local delivery agent 114 to perform enhanced messaging services. To the server 112, the PMA 220 behaves like the local delivery agent 114. To the local delivery agent 114, the PMA 220 acts like the server 112. This transparency makes it easy to integrate the functionality of the PMA 220 into any existing e-mail infrastructure. The PMA 220 may be implemented in software, hardware, or a combination of software and hardware. If implemented in software, the PMA 220 may be stored within a computer-readable medium. A computer-readable medium may include one or more memory devices.

Figure 3:
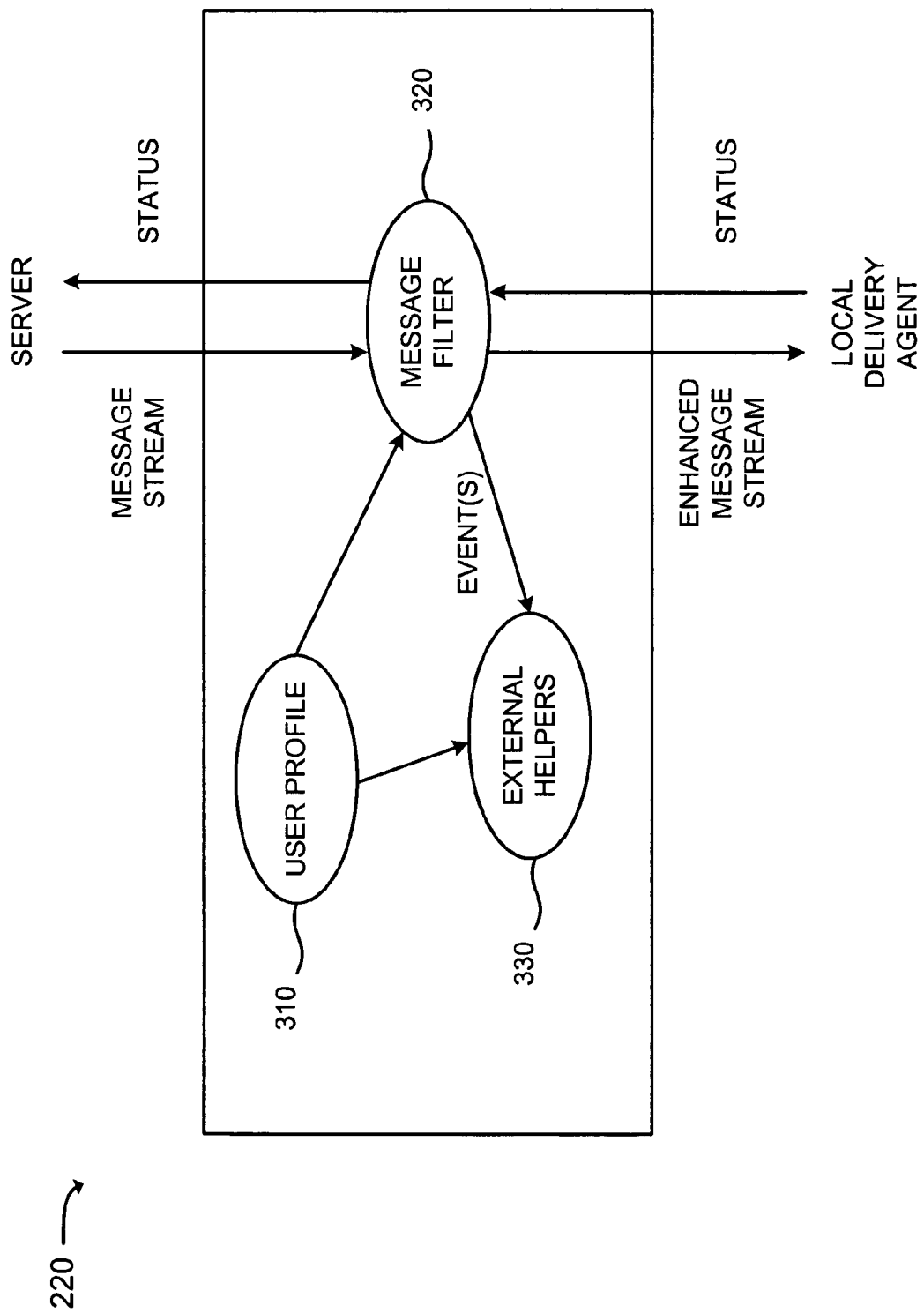
FIG. 3 is a detailed diagram of the personal messaging agent (PMA) of FIG. 2 according to an implementation consistent with the present invention.

FIG. 3 is a detailed diagram of the PMA 220 according to an implementation consistent with the present invention. An instance of the PMA 220 may be created on a per message/per recipient basis (i.e., for each message placed in a specific recipient's mailbox 120). For example, a trigger may be generated upon receipt of a new message. The trigger may cause a process to execute that generates an instance of the PMA 220.

The PMA 220 may include a user profile 310, a message filter 320, and external helpers 330. The user profile 310 may store information regarding personal preferences of an e-mail recipient or user. The personal preferences may determine the way messages are processed by the message filter 320 and the external helpers 330 on behalf of the e-mail recipient or user.

The message filter 320 may parse an incoming message stream, such as an RFC822/MIME stream, inspect the message contents (i.e., the header and body parts), and dynamically modify the message (e.g., extract/insert/replace header fields and/or body parts) based on the user's preferences in the user profile 310. For example, the message filter 320 may extract a media file attachment and replace it with streaming controls or insert a targeted advertisement.

The message filter 320 may also generate "events" at various stages of message processing to allow the external helpers 330 to perform additional operations outside the context of the message stream (i.e., out-of-band). For example, after extracting a media file, the message filter 320 may generate an event that triggers an external helper 330 to perform any user-requested media translations (e.g., creating a textual transcript of an audio file). Similarly, when a (modified) message is finally placed in the user's mailbox 120, the message filter 320 may generate an event to initiate an external helper 330 to perform additional message-related processing. Examples include, but are not limited to, notifying the user of the new message (e.g., sending a pager notification, displaying a dialog box on a computer, etc.), redirecting the message to other preferred mail account(s), and automatically generating a customized response to the e-mail sender.

The external helpers 330 may include extensible mechanisms that allow the PMA 220 to separate the processing of a message into in-band and out-of-band processing. In-band processing refers to processing that has an impact on the enhanced message stream being produced. Out-of-band processing refers to everything else. For example, consider the replacement of a large audio attachment with streaming media controls in terms of in-band and out-of band processing. To replace an audio attachment, the audio file must be extracted from the message stream, converted to a streaming format, placed on a media server, and replaced with interactive controls in the message stream to allow the user to activate the media stream. Extracting the audio to a media file and replacing it with streaming controls are in-band processing since they directly impact the resulting message stream. Manipulating the file format and interacting with a media server have no impact on the message stream and, therefore, are considered out-of-band processing that can be performed in parallel with the in-band processing or, perhaps, deferred.

Another example of out-of-band processing includes performing cross-media translation (e.g., converting the audio file into a textual transcript). This distinction between in-band and out-of-band processing ensures efficient processing that is not subject to the delays associated with adjunct processing and allows the PMA 220 to be easily extended, without adversely impacting processing performance.

In addition, an event may be generated when the local delivery agent 114 returns its status indicating whether the enhanced message was successfully placed in the user's mailbox 120. The external helper 330 for this event can perform many different operations, such as notifying the user of the new message (e.g., sending a pager notification, displaying a dialog box on a computer, etc.), redirecting the message to other preferred mail account(s), and automatically generating a customized response to the e-mail sender.

Exemplary Message Filter

The message filter 320 plays the central role of examining and possibly enhancing a message stream as it passes between the server 112 and the local delivery agent 114. The message filter 320 may initiate the local delivery agent 114 responsible for placing the enhanced message in the user's mailbox 120. The message filter 320 may then process the incoming message stream, generate an enhanced message stream (as well as other output files), and trigger events that initiate external helpers 330. To support these operations, the message filter 320 may include several components.

Figure 4:
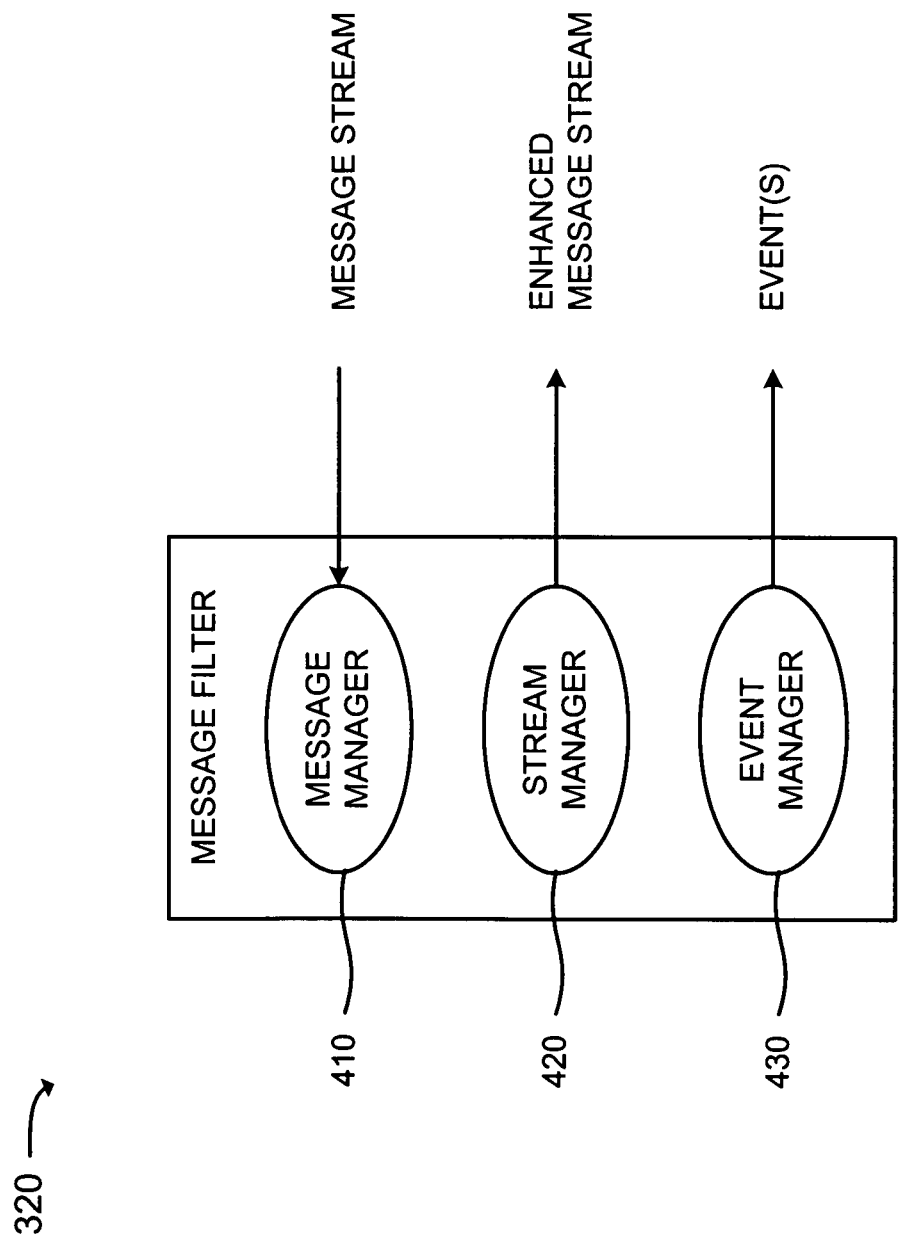
FIG. 4 is a detailed diagram of the message filter of FIG. 3 according to an implementation consistent with the present invention.

FIG. 4 is a detailed diagram of the message filter 320 according to an implementation consistent with the present invention. The message filter 320 may include a message manager 410, a stream manager 420, and an event manager 430. The message manager 410 is the central component of the message filter 320 and performs the in-band message recognition/enhancement operations. The stream manager 420 manages the output streams needed during message processing, including the enhanced message stream to the local delivery agent 114 as well as any other streams needed to create various output files (e.g., an extracted media file). The event manager 430 delivers events to the external helpers 330.

The message manager 410 performs the examination and possible modification of the message stream. In some implementations consistent with the present invention, the message manager 410 does not store a complete representation of the input message in memory. Rather, the message manager 410 may buffer the smallest possible unit of the message stream until a determination can be made about the disposition of that unit, at which point the results are placed in the output stream. By minimizing the amount of memory required, the message manager 410 places few demands on the computing/storage resources of the host platform. In order to perform the recognition task, the message manager 410 creates a collection of support components.

Figure 5:
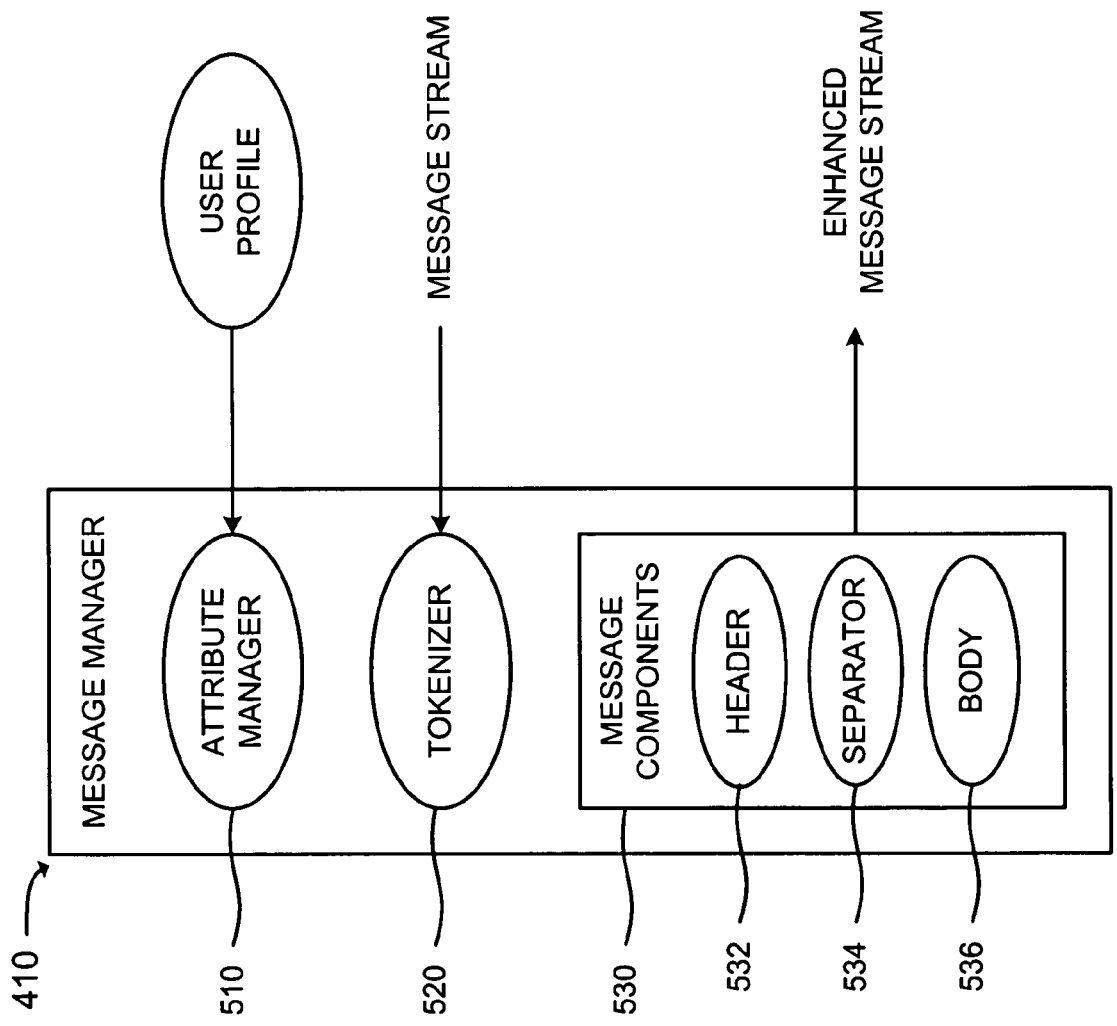
FIG. 5 is a detailed diagram of the message manager of FIG. 4 according to an implementation consistent with the present invention.

FIG. 5 is a detailed diagram of the message manager 410 according to an implementation consistent with the present invention. The message manager 410 may include an attribute manager 510, a tokenizer 520, and message components unit 530. The attribute manager 510 may maintain a hierarchical namespace that contains name value pairs for items, such as user preferences, message fields, and processing state. The attribute manager 510 may also provide functions for adding/removing hierarchies, searching, adding name value pairs, and retrieving the value for a named item.

The tokenizer 520 may include a lexical analyzer responsible for reading the incoming message stream and reducing it to a set of tokens. The tokenizer 520 may assign each token a name and match it with a corresponding value that will be used to reconstruct the enhanced message stream.

The message components unit 530 may create a number of components that correspond to the structural elements of an e-mail message. Initially, it creates three components that mimic the three major structural elements of any message: a header 532, a separator 534, and a body 536. Each of the components may recognize a specific piece of an e-mail message, tailor it based on user-defined preferences, and then pass the results to the output stream (i.e., the enhanced message stream). The message components unit 530 may create additional components, such as field, boundary, and body part, as necessary to perform similar functions for other significant sub-components of an e-mail message.

Along with the tokenizer 520 and the attribute manager 510, the message components unit 530 form a complete parser for e-mail messages. Each of the components identified above provides a common set of functions: Initialize, Recognize, Actions, and End.

The Initialize function may be performed prior to any other function and is responsible for general startup housekeeping relevant to the specific message component. The Initialize function is invoked whenever an attempt to identify that particular type of message component is initiated. The particular message component dictates the types of processing performed. For example, the Initialize function of the body part component may ask the attribute manager 510 to create a new frame in the name space to ensure that any name/value pairs defined by this body part do not conflict with those from the header or any other body part.

The Recognize function is responsible for identifying that portion of the input message stream that corresponds to the message component. Each message component implements a subset of the message stream grammar. For example, a message header includes one or more fields and each field includes a label and a value. In order to recognize a message header, the Recognize function of the header component 532 repeatedly invokes the functions of a field component until it encounters something other than a field in the input message stream. All processing that occurs within the Recognize function can be customized based on user preferences. For example, a user preference that large audio attachments be replaced with streaming controls will cause the Recognize function of a body part to redirect its audio content to a file rather than to the resulting output stream.

The Actions function is responsible for taking any semantic actions relevant to the recognized message component. Possible semantic actions include saving information that affects the processing of other message components or applying user preferences to the generated output stream. Continuing the previous example with respect to large audio attachments, the Actions function of a "Content-Transfer-Encoding" field, which identifies the encoding used for the content, saves its value in the attribute manager 510 so that its encompassing body part can properly recognize and extract the audio content. Then, based on user-defined preferences, the Actions function of the body part component may insert streaming controls into the output stream.

The End function is performed after all other functions and is responsible for cleanly wrapping up any processing necessary for that message component. For example, because of possible transformations that may be applied to a message, the original "Content-Type" field in the message header may not accurately describe the resulting message and, thus, must be adjusted. The End function of the header component 532 ensures that an appropriate "Content-Type" field is placed in the output stream. Like the other functions, the End function may also apply user preferences. The End function of the body component 536 may handle the case in which a user authorizes that advertisements be included at the end of a message.

Exemplary Processing

Figure 6:
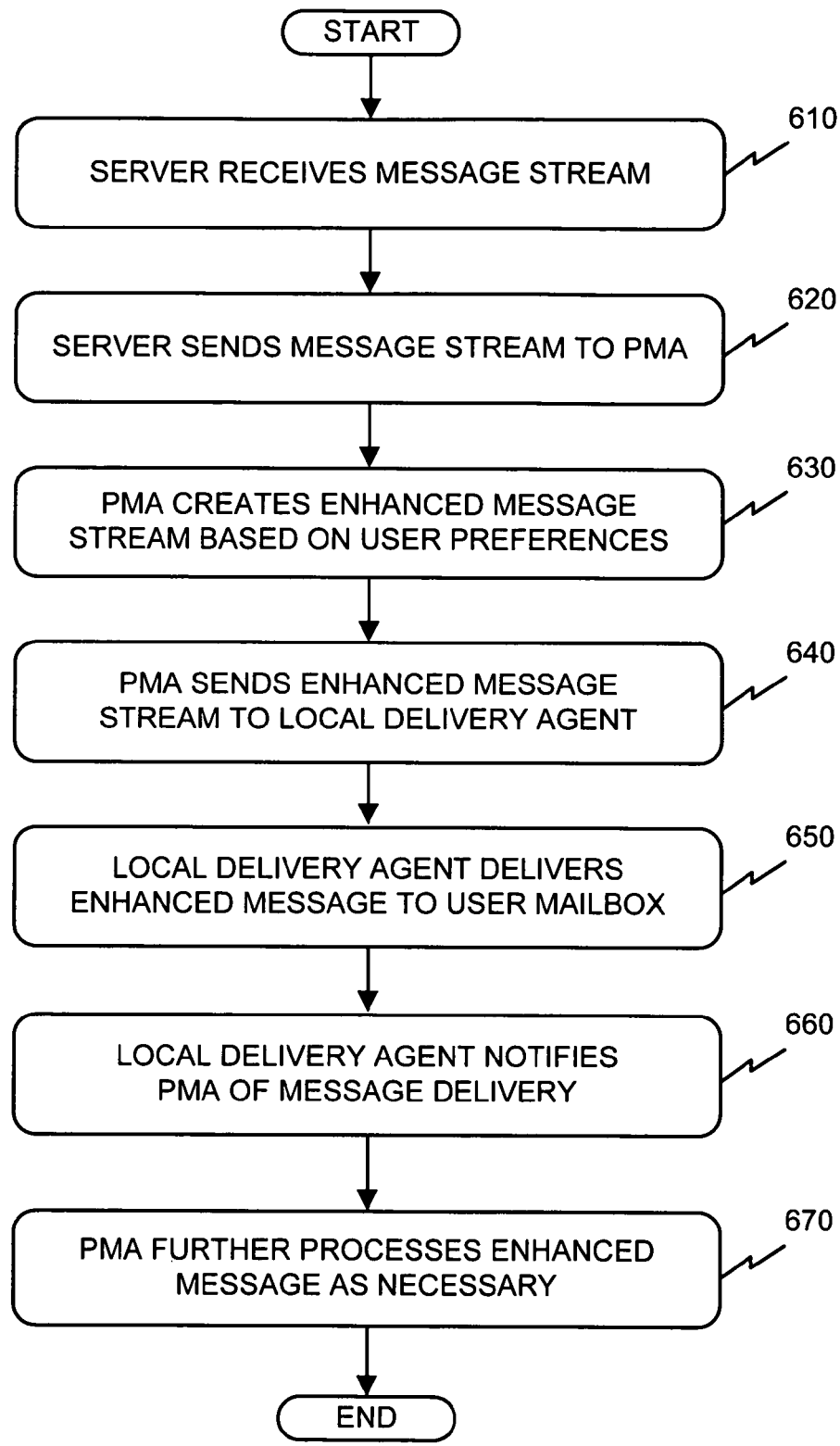
FIG. 6 is a flowchart of processing for providing enhanced message services according to an implementation consistent with the present invention.

FIG. 6 is a flowchart of processing for providing enhanced message services according to an implementation consistent with the present invention. Processing may begin when an e-mail sender creates an e-mail message using, for example, conventional e-mail software. The e-mail software may encode the e-mail message as a message stream, such as an RFC822/MIME steam, and transmit it across the network based on its destination address. The network may route the message stream to a specific domain using a standard message transfer protocol, such as SMTP. Within that domain, a server responsible for placing the message in a destination mailbox, such as the server 112, receives the message stream [step 610].

The server 112 processes the message stream to identify the appropriate destination mailbox and sends the message stream to an instance of the PMA 220 [step 620]. The PMA 220 processes the message stream to create an enhanced message stream based on user preferences [step 630].

Figure 7:
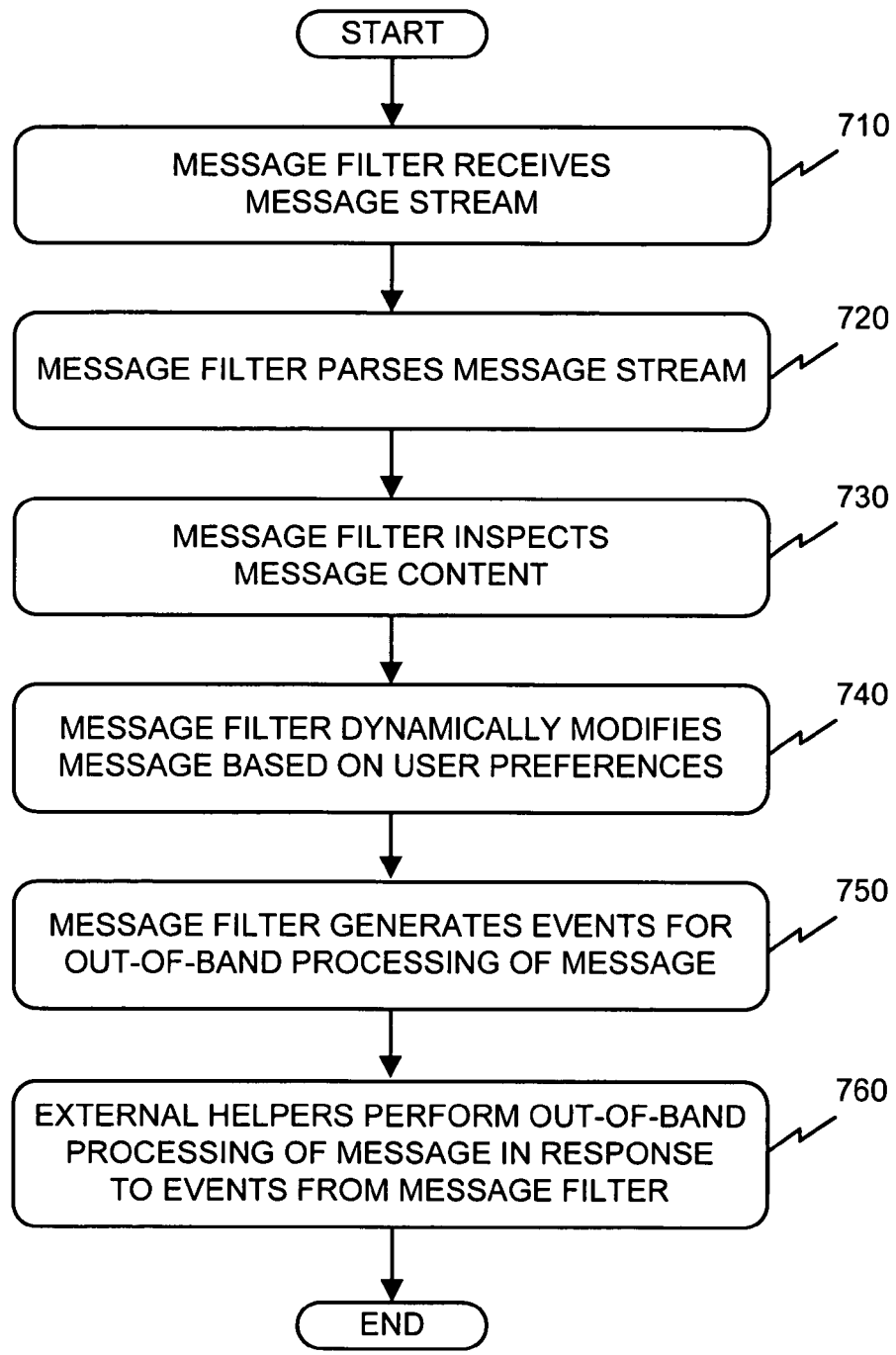
FIG. 7 is a flowchart of processing for creating an enhanced message stream in an implementation consistent with the present invention.

FIG. 7 is a flowchart of processing for creating an enhanced message stream in an implementation consistent with the present invention. The message filter 320 (FIG. 3) within the PMA 220 receives the message stream [step 710]. The message filter 320 may parse the message stream [step 720]. For example, the message filter 320 may analyze the message stream to identify different parts of the message, such as the header, separator, and body. The message filter 320 may then inspect the message contents to possibly determine what fields are included in each of the message parts [step 730].

The message filter 320 may dynamically modify the message based on user preferences [step 740]. The message filter 320 may obtain the user preferences from the user profile 310. Based on the user preferences, the message filter 320 may perform any necessary in-band processing on the message stream, thereby creating an enhanced message stream.

The message filter 320 may also generate events relating to out-of-band processing of the message stream [step 750]. For example, the out-of-band processing may include notifying the e-mail recipient of the new message, performing media translations, such as creating a textual transcript from an audio file, automatically generating a reply message, etc. The external helpers 330 perform the out-of-band processing in response to the events generated by the message filter 320 [step 760]. In some implementations consistent with the present invention, steps 750 and 760 may occur concurrently with step 740.

Figure 8:
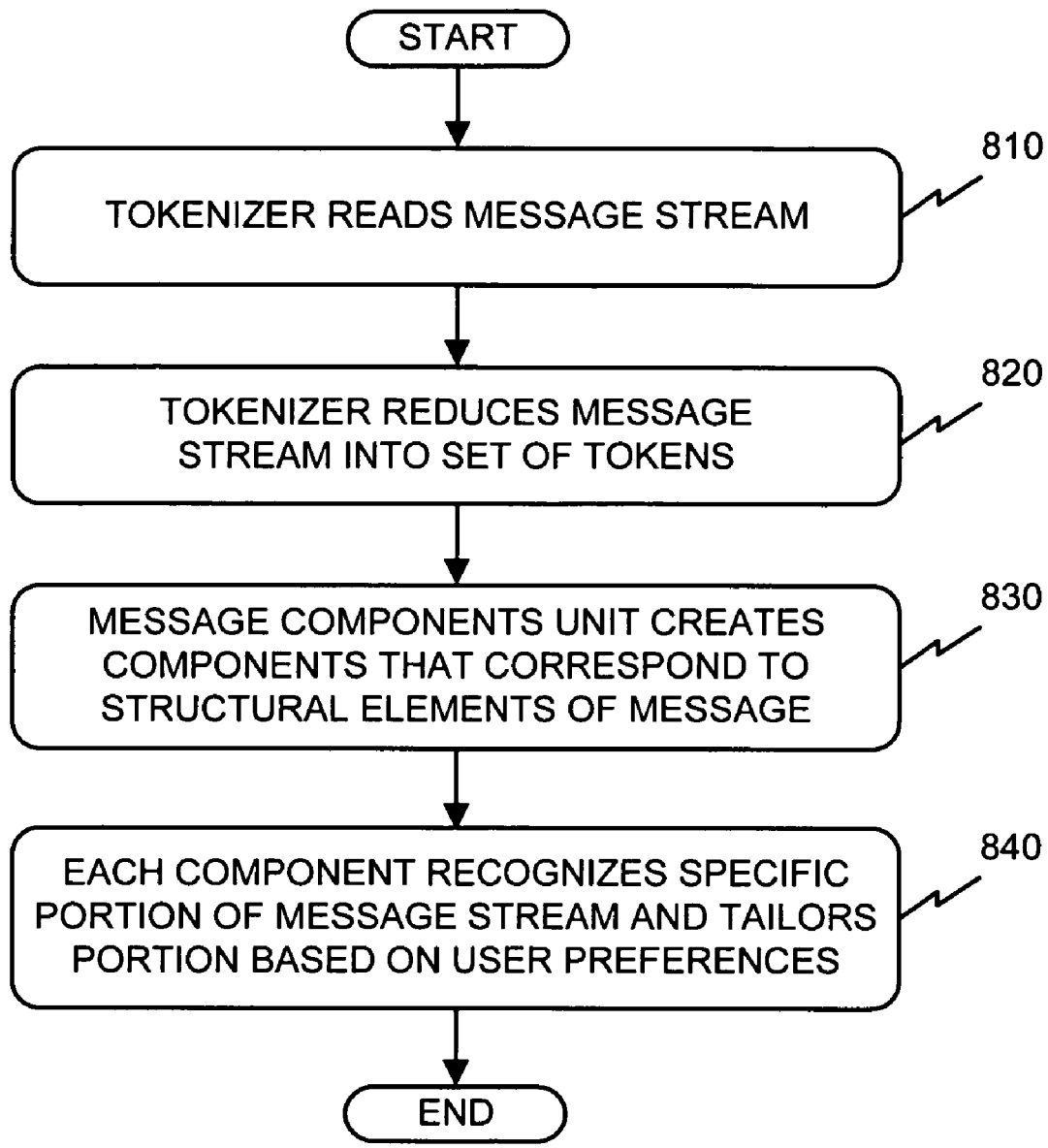
FIG. 8 is a flowchart of processing by components of the message filter of FIG. 3 according to an implementation consistent with the present invention.

Generally, steps 720–740 may be described in terms of processing performed by the components of the message filter 320. FIG. 8 is a flowchart of processing by components of the message filter 320 according to an implementation consistent with the present invention. The tokenizer 520 (FIG. 5) may read the message stream [step 810] and reduce it to a set of tokens [step 820]. The tokenizer 520 may assign a name to each token and match it with a corresponding value that may be used later to reconstruct the enhanced message stream.

The message components unit 530 may create a number of components that correspond to the structural elements of the message [step 830]. For example, the message components unit 530 may initially create header 532, separator 534, and body 536 components (i.e., three components that correspond to the major structural elements of any message). The message components unit 530 may create additional components that correspond to other significant sub-components of the message.

Each of the components 532–536 may recognize a specific portion of the message and modify it based on user preferences [step 840]. The modified portions may then be combined to form the enhanced message stream.

Returning to FIG. 6, the PMA 220 sends the enhanced message stream to the local delivery agent 114 for delivery to the appropriate destination user mailbox 120 [step 640]. The local delivery agent 114 may deliver the enhanced message stream to the user mailbox 120 [step 650]. When the local delivery agent 114 finishes the delivery, the local delivery agent 114 may notify the PMA 220 whether the delivery was successful [step 660]. The local delivery agent 114 may make the notification through the use of a status message. The PMA 220 may, in turn, notify the server 112 of the success of the message delivery.

Once the enhanced message has been delivered to the user mailbox 120, the PMA 220 may further process the enhanced message based on the user preferences [step 670]. For example, the PMA 220 may notify the user of the new message (e.g., sending a pager notification, displaying a dialog box on a computer, etc.), forward the message to other preferred mail account(s), or automatically generate a customized response to the e-mail sender.

The e-mail recipient may then retrieve the message using an e-mail client 140. The e-mail client 140 may use a conventional message access protocol, such as POP3 or IMAP4, to open the user mailbox 120 and return the content/state information about the message to the e-mail recipient.

CONCLUSION

Systems and methods consistent with the present invention provide enhanced message services using cost-effective, extensible processing techniques. The processing techniques include, for example, embedding interactive and/or actionable components directly within a message to provide enhanced functionality to a user. The systems and methods separate message modification into in-band and out-of-band processing to achieve efficiency, flexibility, and scalability.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, systems and methods have been described in terms of e-mail messages. In other implementations consistent with the present invention, other types of messages may be used.

Also, it has been described that an instance of the PMA 220 is created to produce a single customized message stream on a per message/per recipient basis. In other implementations consistent with the present invention, the PMA 220 operates over multiple message streams for multiple recipients.

The scope of the invention is defined by the claims and their equivalents.

What is claimed is:

1. In a message arrival component, a personal messaging agent, comprising:
   a user profile configured to store user preferences for processing messages;
   a message filter configured to receive a message, perform in-band processing on the message based on the user preferences, and generate at least one event for triggering out-of-band processing of the message based on the user preferences; and
   at least one external helper configured to perform the out-of-band processing of the messages in response to the at least one event;
   wherein the user profile, the message filter and the external helper are created upon receipt of each one of the messages by the message arrival component.

2. The personal messaging agent of claim 1, wherein the message filter includes:
   a message manager configured to examine the message and modify the message based on the user preferences, and
   an event manager configured to send the at least one event to the at least one external helper to trigger the out-of-band processing.

3. The personal messaging agent of claim 2, wherein the message manager includes:
   a tokenizer configured to read the message and reduce the message to a set of tokens.

4. The personal messaging agent of claim 2, wherein the message manager includes:
   a plurality of message components corresponding to elements of the message, each of the message components being configured to recognize a specific portion of the message and modify the specific portion based on the user preferences.

5. The personal messaging agent of claim 4, wherein the message components include:
   a header component configured to process a header portion of the message,
   a separator component configured to process a separator portion of the message, and
   a body component configured to process a body portion of the message.

6. The personal messaging agent of claim 1, wherein the message filter is further configured to generate an enhanced message from the in-band processing and transmit the enhanced message for delivery to the one or more mailboxes of the user associated with one or more message recipients.

7. The personal messaging agent of claim 6, wherein the at least one external helper is configured to further process the message after delivery of the message to the one or more mailboxes.

8. The personal messaging agent of claim 7, wherein the at least one external helper is configured to at least one of automatically generate a reply to the message, deliver the message to one or more alternate mailboxes, or notify the one or more message recipients of the delivery of the message.

9. In a message arrival component a system for providing personal messaging services, comprising:
   means for storing user preferences for processing at least one message;
   means for receiving a message;
   means for performing in-band processing on the message based on the user preferences to create a processed message;
   means for generating at least one event for triggering out-of-band processing of the processed message based on the user preferences,
   means for performing the out-of-band processing of the processed message in response to the at least one event to create an enhanced message; and
   means for providing the enhanced message for delivery to the user;
   wherein the system is created upon each receipt of the at least one message.

10. A computer implemented method for providing enhanced messaging services, comprising:
    receiving a message stream intended for a message recipient;
    performing in-band processing on the message stream based on one or more preferences of the message recipient to create a processed message stream;
    generating at least one event for triggering out-of-band processing of the processed message stream based on the one or more preferences of the message recipient; and
    performing the out-of-band processing of the processed message stream in response to the at least one event and prior to delivery of the processed message stream to the message recipient;
    wherein the in-band processing, the event generating and the out-of-band processing are created upon receipt of each message in the message stream.

11. The method of claim 10, wherein the performing in-band processing includes:
examining the message stream, and
modifying the message stream based on the one or more preferences of the message recipient.

12. The method of claim 11, wherein the examining includes:
reading the message stream, and
reducing the message stream to a set of tokens.

13. The method of claim 10, wherein the performing in-band processing includes:
creating a plurality of message components that correspond to elements of the message stream, each of the message components being configured to recognize a specific portion of the message stream and modify the specific portion based on the one or more preferences of the message recipient.

14. The method of claim 13, wherein the message components include at least a header component, a separator component, and a body component; and
wherein the performing in-band processing further includes:
processing a header portion of the message stream by the header component,
processing a separator portion of the message stream by the separator component, and
processing a body portion of the message stream by the body component.

15. The method of claim 10, further comprising:
transmitting the processed message stream for delivery as a message to the one or more mailboxes associated with the message recipient.

16. The method of claim 15, wherein the performing out-of-band processing further includes:
processing the message after delivery to the one or more mailboxes.

17. The method of claim 16, wherein the processing includes:
at least one of automatically generating a reply to the processed message stream, delivering the processed message stream to one or more alternate mailboxes, or notifying the message recipient of the delivery of the processed message stream.

18. A computer-readable medium that stores instructions executable by at least one processor to perform a method for providing personal messaging services, the method comprising:
performing in-band processing on each received message in a message stream based on one or more personal preferences of a message recipient to create a processed message;
generating at least one event for triggering out-of-band processing of the processed message based on the one or more personal preferences of the message recipient; and
performing the out-of-band processing of the processed message in response to the at least one event and prior to delivery of the processed message to the message recipient;
wherein the method is created upon receipt of the each received message in the message stream.

19. The computer-readable medium of claim 18, wherein the instructions for performing in-band processing includes:
instructions for examining the received message, and
instructions for modifying the received message based on the one or more personal preferences of the message recipient.

20. The computer-readable medium of claim 18, wherein the instructions for performing in-band processing includes:
instructions for creating a plurality of message components that correspond to elements of the received message, each of the message components being configured to recognize a specific portion of the received message and modify the specific portion based on the one or more personal preferences of the message recipient.

21. The computer-readable medium of claim 18, wherein the instructions for performing out-of-band processing includes:
instructions for processing the processed message after providing the processed message for delivery to the message recipient.

22. A message arrival system, comprising:
a server configured to receive a plurality of message streams from a plurality of message senders, each of the message streams being destined for one or more message recipients;
a plurality of personal messaging agents configured to receive the message streams from the server, perform in-band and out-of-band processing of the message streams based on preferences of the one or more message recipients to create enhanced message streams, and output the enhanced message streams wherein one of the plurality of personal messaging agents is created each time a message in its respective one of the plurality of message streams is received by the message arrival system; and
a local delivery agent configured to receive the enhanced message streams and deliver the enhanced message streams as enhanced messages to one or more mailboxes of the one or more message recipients.

23. The message arrival system of claim 22, wherein the local delivery agent is further configured to generate status messages that indicate whether the deliveries of the enhanced message streams were successful.

24. The message arrival system of claim 23, wherein the personal messaging agents are further configured to receive the status messages from the local delivery agent and provide the status messages to the server.

25. The message arrival system of claim 22, wherein the personal messaging agents are configured to further process the enhanced messages after the local delivery agent delivers the enhanced messages.

26. An e-mail system, comprising:
a message arrival component including:
a server configured to receive an e-mail message from an e-mail sender and destined for one or more e-mail recipients,
a personal messaging agent configured to receive the e-mail message from the server, perform in-band and out-of-band processing on the e-mail message based on preferences of the one or more e-mail recipients to create a processed e-mail message, and output the processed e-mail message wherein the persoanl messaging agent is created upon receipt of the e-mail message by the server, and
a local delivlery agent configured to receive the processed e-mail message and store the processed e-mail message in one or more mailboxes associated with the one or more e-mail recipients; and
a message retrieval system configured to retrieve the processed e-mail message from the one or more mailboxes and deliver the processed e-mail message to the one or more e-mail recipients.

27. The e-mail system of claim 26, wherein the personal messaging agent is configured to further process the processed e-mail message after the local delivery agent stores the processed e-mail messages in the one or more mailboxes.

28. The e-mail system of claim 26, wherein the personal messaging agent is configured to separate processing of the e-mail message into the in-band processing the and out-of-band processing.

29. A method for performing personal e-mail services, comprising:

storing e-mail processing preferences for an e-mail recipient;

receiving an e-mail message stream from an e-mail sender and destined for the e-mail recipient;

performing in-band and out-of-band processing on each e-mail message in the e-mail message stream based on the e-mail processing preferences wherein capability for the in-band and out-of-band processing of each e-mail message is created upon receipt of the each e-mail message; and providing the e-mail message for delivery to the e-mail recipient after performing at least a portion of the in-band and out-of-band processing.

* * * * *